United States Patent [19]

Waclawsky et al.

[11] Patent Number: 5,802,041
[45] Date of Patent: Sep. 1, 1998

[54] MONITORING ETHERNET LANS USING LATENCY WITH MINIMUM INFORMATION

[75] Inventors: John Gary Waclawsky, Frederick; Mahendran Velauthapillai, Adelphi, both of Md.

[73] Assignee: International Business Machines Corporation, Armonk, N.Y.

[21] Appl. No.: 931,964

[22] Filed: Sep. 17, 1997

Related U.S. Application Data

[63] Continuation of Ser. No. 456,255, May 31, 1995, abandoned.

[51] Int. Cl.$^6$ .................................. H04J 3/14; H04J 12/26
[52] U.S. Cl. ............................ 370/245; 370/252; 371/20.6
[58] Field of Search ........................ 370/241, 242, 370/245, 252, 253; 371/20.1, 20.4, 20.6; 348/180; 375/224; 379/1

[56] References Cited

U.S. PATENT DOCUMENTS

| | | | |
|---|---|---|---|
| T955,010 | 2/1977 | Ragonese et al. | 395/184.01 |
| 4,227,245 | 10/1980 | Edblad et al. | 364/468.01 |
| 4,458,309 | 7/1984 | Wilder, Jr. | 395/183.06 |
| 4,459,656 | 7/1984 | Wilder, Jr. | 395/550 |
| 4,521,849 | 6/1985 | Wilder, Jr. | 395/183.06 |
| 4,779,194 | 10/1988 | Jennings et al. | 395/650 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,916,694 | 4/1990 | Roth | 370/94.1 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 395/650 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,198,805 | 3/1993 | Whiteside et al. | 340/825.06 |
| 5,223,827 | 6/1993 | Bell et al. | 340/825.06 |
| 5,282,194 | 1/1994 | Harley, Jr. et al. | 370/17 |
| 5,365,514 | 11/1994 | Hershey et al. | 370/17 |
| 5,375,070 | 12/1994 | Hershey et al. | 364/550 |
| 5,414,833 | 5/1995 | Hershey et al. | 395/575 |
| 5,493,689 | 2/1996 | Waclawsky et al. | 395/821 |
| 5,495,426 | 2/1996 | Waclawsky et al. | 364/514 |
| 5,497,460 | 3/1996 | Bailey et al. | 395/183.15 |
| 5,500,855 | 3/1996 | Hershey et al. | 370/13 |
| 5,526,283 | 6/1996 | Hershey et al. | 364/551.01 |

*Primary Examiner*—Chi H. Pham
*Assistant Examiner*—Ricky Q. Ngo
*Attorney, Agent, or Firm*—John D. Flynn; Morgan & Finnegan

[57] ABSTRACT

A system and method monitor and control an Ethernet local area network, by monitoring bit gap distances between adjacent frames communicated by stations on the local area network. By analyzing the number of events for pre-selected bit gap distances, the network traffic characteristics can be characterized and interconnection paths between stations in the network can be altered.

7 Claims, 7 Drawing Sheets

FIG. 5A
FORMAL
OPERATION

FIG. 5B
HARDWARE DEFECT
DETECTED
COUNTER #1 >0

FIG. 5C
CONGESTION
DETECTED
COUNTER #2, #3
HIGH

MONITORING ETHERNET LANS USING LATENCY WITH MINIMUM INFORMATION

This is a continuation of application Ser. No. 08/456,255, filed on May 31, 1995 now abandoned.

FIELD OF THE INVENTION

The invention disclosed broadly relates to data processing systems and data communications systems and more particularly relates to the monitoring and control of networks for data processing systems.

BACKGROUND OF THE INVENTION

The invention disclosed herein is related to U.S. Pat. No. 5,365,514 by Hershey and Waclawsky et al entitled "Event Driven Interface For A System for Monitoring and Controlling A Data Communications Network", which is assigned to the IBM Corporation and incorporated herein by reference.

This invention is also related to U.S. Pat. No. 5,375,070 by Hershey and Waclawsky et al entitled "Information Collection Architecture and Method for a Data Communications Network", which is assigned to the IBM Corporation and incorporated herein by reference.

The above cited patents by Hershey, et al. describe the Event Driven Interface (EDI) which is a mechanism for identifying bit patterns in the serial bit stream of a data communications network. The Event Driven Interface performs pattern recognition based upon a program defined by control vectors. The Event Driven Interface has an input connected to the data communications network for receiving the serial bit stream and for performing a logical pattern recognition on the serial bit stream to produce event vector signals as an output in response to the identification of specific, predefined patterns in the bit stream.

It would be useful to apply the realtime pattern recognition capability of the Event Driven Interface to the problem of monitoring, analyzing, configuring, and diagnosing (problem determination) an Ethernet or other types of carrier sense multiple access with collision detection (CSMA/CD) local area network (LAN).

OBJECTS OF THE INVENTION

It is therefore an object of the invention to provide more effective control over an Ethernet network.

It is a further object of the invention to provide a more reliable monitoring of the traffic patterns on an Ethernet network.

It is a further object of the invention to efficiently monitor, analyze and diagnose problems on an Ethernet or CSMA/CD LAN using inter-frame latency.

It is still another object of the invention to utilize the inter-frame latency using the minimum number of bits to identify problems and monitor the activity on an Ethernet or CSMA/CD bus.

It is still another object of the invention to allow the assessment of the effectiveness of a LAN design (or LAN configuration) using the minimum number of bits and the histogram of the current activity obtained by observing the inter-frame latency on the Ethernet bus.

Another object of this invention is the definition of a set of absolute boundary conditions in which to evaluate Ethernet behavior. The boundary conditions being a value of 96 bits at the minimum and a value of 3,668,992 bits as the maximum.

SUMMARY OF THE INVENTION

These and other objects, features and advantages are accomplished by the invention. A system and method are disclosed to monitor and control an Ethernet local area network, by monitoring bit gap distances between adjacent frames communicated by stations on the local area network. By analyzing the number of events for pre-selected bit gap distances, the network traffic characteristics can be characterized and interconnection paths between stations in the network can be altered.

The invention includes an event driven interface coupled to the local area network, for monitoring bit gap distances between adjacent frames communicated by stations on the local area network, and outputting count values for selected bit gap distances. Also included is an analysis computer coupled to an output of the event driven interface, for analyzing the count values and outputting control signals. A network switch is coupled to an output of the analysis computer and coupled to the stations on the local area network, for altering interconnection paths between the stations in response to the control signals.

DESCRIPTION OF THE FIGURES

These and other objects, features and advantages will be more fully appreciated with reference to the accompanying figures.

FIG. 7 further shows how signals are obtained by monitoring the Ethernet network and with the event driven interface, accumulating event counts at selected inter-frame intervals, and then analyzing the accumulated counts on a periodic basis, to infer network conditions and in response to the inferred conditions, apply control to the network to reroute signals or otherwise reconfigure the network.

DISCUSSION OF THE PREFERRED EMBODIMENT

The problem solved by the invention is the ability to monitor and determine whether or not an Ethernet or a particular Ethernet LAN segment is running efficiently or needs more capacity. To do this, the invention makes use of the frame structure for Ethernet and CSMA/CD activity.

All monitoring activities today revolve around the examination of individual packets on the media. This is currently done by looking at the number and size of the packets to infer the current performance characteristics of the Ethernet local area network. This method yields inaccurate results and in many cases it is very difficult to control the LAN and to understand whether it needs additional capacity. The invention disclosed herein does not look at individual packets on the media. Instead, it examines the spaces between the packets on the media and uses that as a more accurate signature to evaluate the performance of an Ethernet. This enables better problem determination, better capacity planning, better design and better configuring of an Ethernet LAN environment. The invention enables real time reconfiguration of the network in response to measurements.

The invention enables running control and response algorithms to control the LAN environment. One of the major problems with LANs today is it is difficult to get accurate information. The invention enables better control of LANs.

The invention uses the Event Driven Interface to perform network monitoring, performance analysis, problem determination and LAN design based on the extraction of information from large bodies of data on high speed communication facilities using Ethernet, IEEE 802.3 and environments using bus technology.

Today, to capture and analyze LAN data, you need large buffers, fast processors and also you have to be able to get the data across the bus to the disk for storage. This is a risky procedure, since there could be loss of data due to buffer depletion and processor or bus contention. Also, for CSMA/CD LAN design and problematic analysis of LANs it is important to know packet lengths and the inter-arrival times between packets. For complete accuracy, it is necessary to acquire this information on a packet by packet basis. Due to the likelihood of finding bottlenecks with the monitoring equipment bus, Registers, Memory and/or the processor, it will be expensive at high speeds to capture each packet, and each inter-arrival time accurately. Instead we ignore the packets and look at the gap between packets (heavily loaded high speed LANs have too much data).

The EDI allows us to define a set of counters to count a set of events. For example a user can define two events: (1) Number of frames generated; (2) Total number of bits generated over a user chosen time period (e.g. 10 seconds). Using EDI we can program two counters; one to count the frames the other to count the bits over a period of 10 seconds. Our method makes use of these counters to monitor the health, analyze and detect problems on a LAN which uses bus technology. The number of counters used depends on the problem being solved. Using EDI it is clear that we can specify counters for any events that we need. Latency is defined as an event. Latency information is captured as the number of bits between frames.

On many LANs, retransmission delays are based on a 512 bit slot time. Looking at the CSMA/CD algorithm one can calculate the worst case retransmission delay for a single collision. This occurs after 9 attempts. It is 52 ms. The worst case time it takes before a packet transmission times out is when the CSMA/CD retransmission algorithm makes all 16 attempts. The maximum retransmission delay before timing out is given by the sum of 2*512+2*2*512+ . . . + 2 * 2 * 2 * 2 * 2 * 2 * 2 * 2 * 2 * 2 * 512 + 5*2*2*2*2*2*2*2*2*2*512. This is 3668992 bit times i.e. 0.367 seconds. The best case is a one slot wait time (512 bits or 51.2 micro seconds if the LAN speed is 10 Mbps) after a collision.

The above values provide clues about tracking retransmission activity and LAN performance. On a 10 Mbps CSMA/CD LAN, if we see packets consistently spaced apart by more than 0.367 seconds (3668992 bit times) we can be certain there were no collisions. Similarly, since the inter-frame gap is 96 bits, if we see packets spaced within 96 bits, we can also conclude that there is a defective component(s) present on the LAN. Clearly by observing the bit latency between adjacent frames the above conclusions can be drawn. This leads us to look closer at intervals between 96 bits and 3668992 bits. We expect to find points X, Y such that 96<X<Y<3668992, and the following is true:

1- If there are transmissions between the interval [0, 96] then the LAN has a defective component(s).

2- If there are many of transmissions between the interval [96, X] then the LAN is heavily loaded and we should observe significant collision activity. Clearly the LAN is in a problem state (or severely congested) and performance problems are evident to the users.

3- If there are many transmissions in the interval [X, Y] then the LAN is in an unstable (or congested) state, any increase in traffic can cause LAN performance to degrade noticeably.

4- If most transmissions are in the interval [Y, 3668992] then the LAN is in a stable state. LAN's performance can only be effected by a significant increase in traffic.

5- If most transmissions are in the interval [3668992, infinity] then the LAN is in a very stable state (no collisions are possible). LAN's performance can only be effected by a very large increase in traffic.

Different values can be used for X and Y. We suggest a value of 2 slots for X, i.e. 1024 bit times. Clearly if packet transmissions are spaced within two slot times the chance of a collision is very high. Also, if there are many transmissions and collisions within a slot time then there is a good chance there are other stations that will want to transmit. Hence we choose the value 1024 for X. We choose 32*512 (16384) bit times for the value of Y. In the retransmission algorithm, this is the worst case delay due to five collisions. From practical experience a successful transmission on any Ethernet after five attempts is very high, hence we choose the value 16384 for Y. Clearly these values may change depending on the configuration and the load on the LAN. The distribution of inter-frame spacing provides an effective indicator of the overall performance health of the LAN. As inter-frame spacing shifts towards X, performance problems will be apparent.

Since latency information is captured in counters. This concept can be extended for any number of frame gap size or latency intervals. Let x0, x1 . . . , xn be positive integers. Consider the following intervals and counters. [0, x1), [x1, x2;), [x2, x3), . . . , [x{n−1}, x{n}), [xn, infinity).

A counter can be used in the invention for each of the following events.

Counter 1. The number of times latency is in the range [0, x1). We suggest the value 96 for x1. This is the smallest number of bits in an interval between two successive CSMA/CD frames. The Ethernet standards specify an inter-frame gap of 96 bits. If this counter is non zero then there is faulty hardware present. The actual count would indicate the magnitude of the problem.

Counter 2. The number of times latency is in the range [x1, x2). This along with other latency counters and a number of frames counter is a good usage indicator of the state of the LAN (a very high count indicates high usage or a congested LAN segment).

Counter 3. The number of times latency is in the range [x2,x3).

Counter n. etc.

An Ethernet slot is a value of 512 bit times and makes an excellent base multiplier for many different values of x. We choose the value 2*512 or 1024 for x2. We choose 32*512 (16384) bit times for the value of x3. The x values can change depending on the configuration and the load on the LAN.

Using the values in the EDI counters we can predict the health of the LAN the following way. The prediction depends on LAN configuration, traffic characteristics and speed. If the value of x2 is "sufficiently small" and counter #2 is "very high" compared to the other counters we can certainly say the LAN is highly congested. Similarly if counter (n) is "very high" and the other counters are "small" we can certainly say the LAN has very low traffic.

Note that media response time for users is not an issue when a CSMA/CD LAN is not heavily loaded. However, thruput and response time become critical when the load increases. Hence, at high loads there is much more data to monitor, so it is unwise to collect data to determine the health of the LAN. Instead we look at the spacing between frames to determine the health of the LAN. Clearly by monitoring the inter-frame latency between transmissions, counting the number of frames in each of the above intervals and tracking collisions we can establish LAN performance. The number of individual counters for inter-frame latency form a distribution histogram of inter-frame spacing. This information allows us to monitor, diagnose and manage the media. The collection interval chosen (how often we ask for the counter values) and the number of counters used will effect the volume of data returned for analysis. We see that an extremely small volume of data (a few counters) can provide information about LAN activity over very large periods of time. Thus we can see that we can use the inter-frame latency categorizations as a distribution histogram that employs the minimum number of bits to identify problems and monitor the activity on a Ethernet or CSMA/CD bus.

Figure 1:
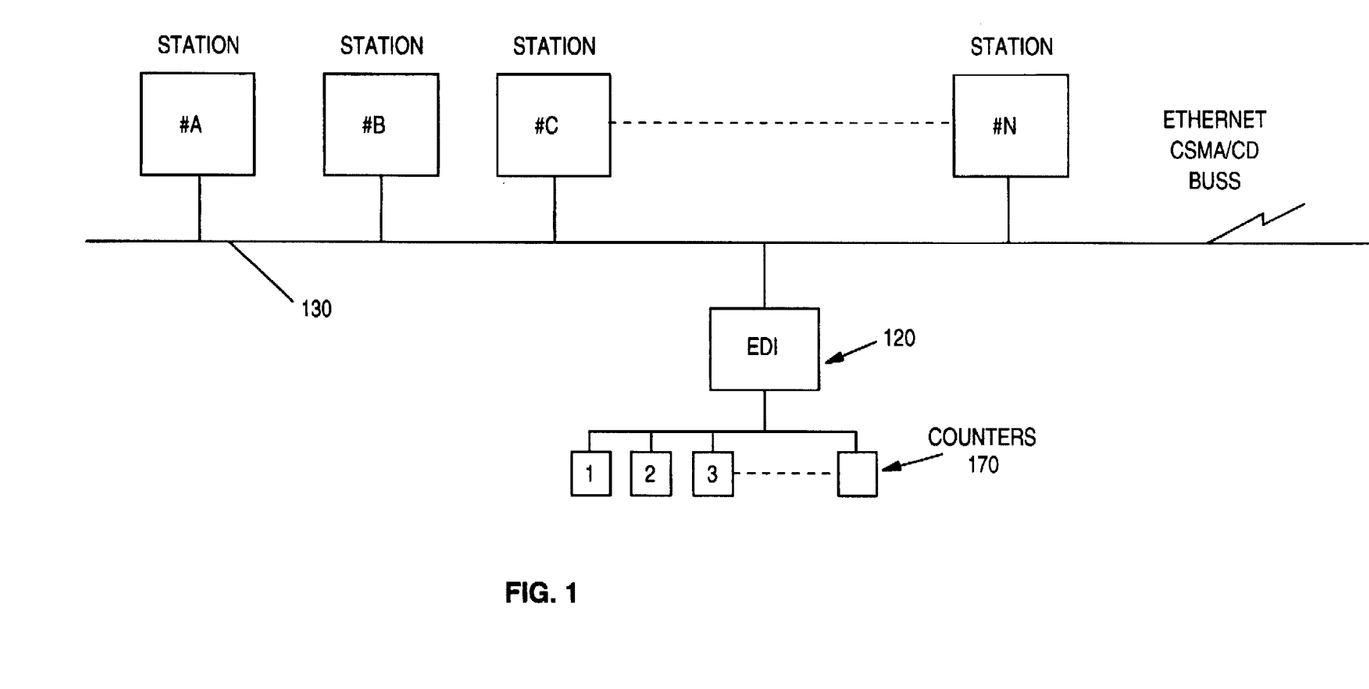
FIG. 1 is a schematic diagram of an Ethernet network showing some of the nodes in the network and the behavior of signals on the network.
Figure 2:
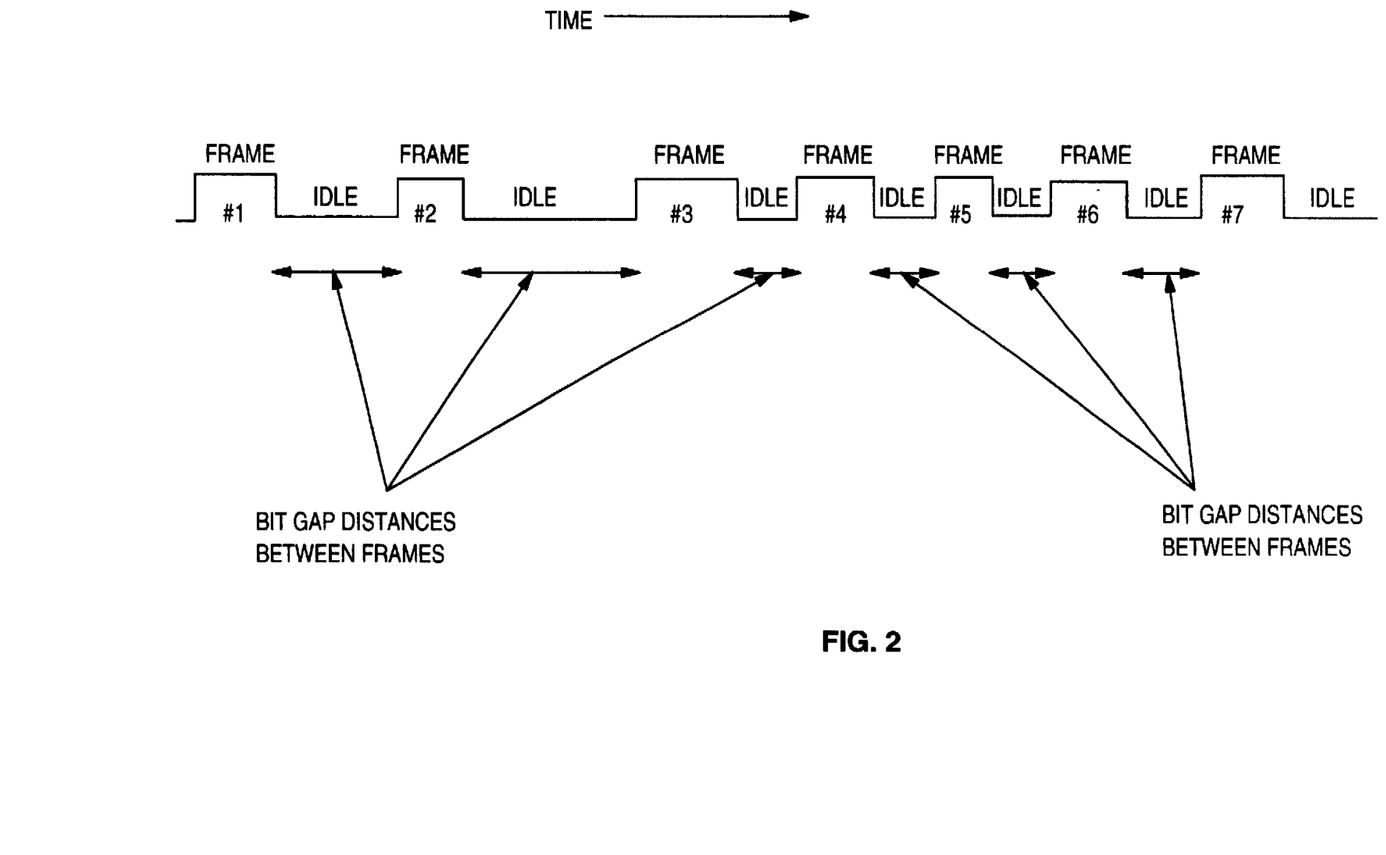
FIG. 2 is a wave form diagram illustrating the data frames on an example Ethernet network.
Figure 3:
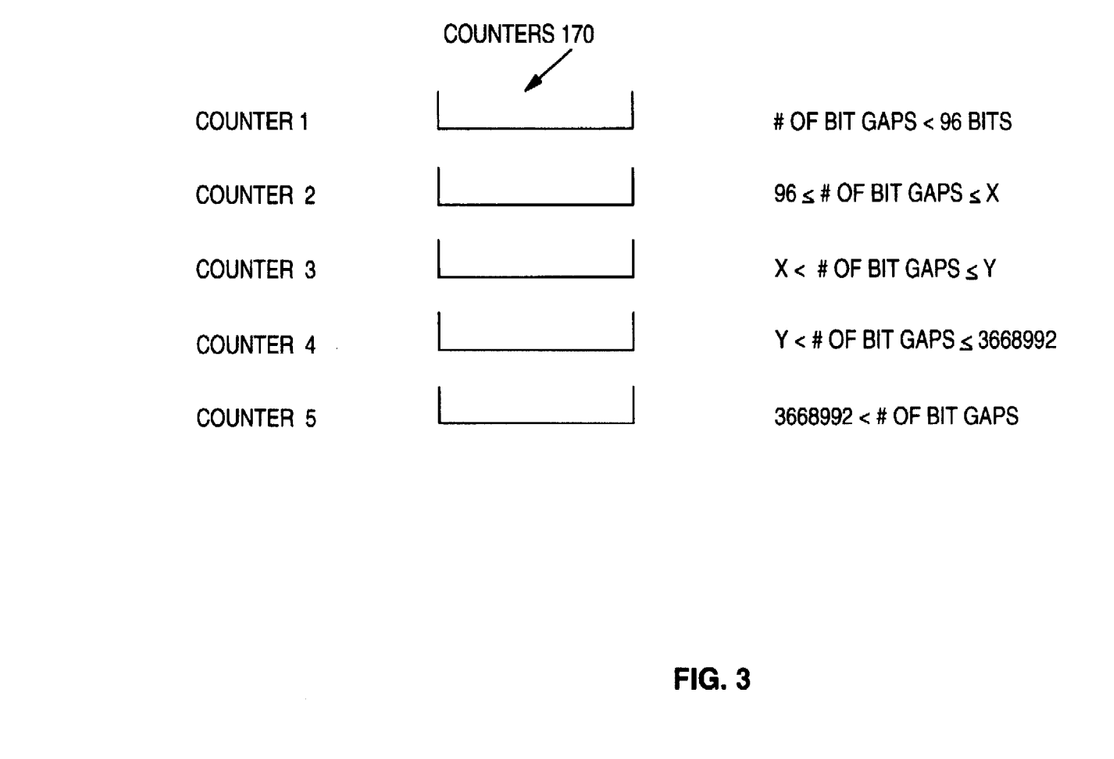
FIG. 3 is a conceptual diagram illustrating the inter-frame duration time between events such as the measured end and beginning of consecutive frames on such as in the wave form diagram of FIG. 2, and further illustrating the positioning of counters at respective inter-frame duration intervals.

FIG. 1 shows an example of an Ethernet bus 130, Ethernet uses an access method called carrier sense multiple access with collision detection which we refer to as CSMA/CD. On bus 130 are stations A through N that are connected to the bus, using the CSMA/CD protocol. Also connected to the bus is an EDI 120. EDI is described in U.S. Pat. No. 5,365,514 and in particular is shown in FIG. 9 of that patent. For any local area network (LAN), an EDI component can be placed on a local area network to evaluate the bit pattern that it sees on the media. In this particular case the EDI is evaluating bit patterns that represent distances or gaps between frames. An example of gaps between frames or gap distances between frames is shown in FIG. 2. In FIG. 2 we see time going from the left hand side of the figure progressing to the right hand side of the figure. We see that there is a frame transmission Frame 1, that is transmitted and then there is an idle period in time which no frame transmissions are seen on the LAN and then Frame 2 begins. There is a distance between the ending of frame 1 and the beginning of frame 2 which we refer to as a bit gap distance. There is another distance between the ending of frame 2 and beginning of frame 3 which is another bit gap distance which will most likely be different from the first. There are other bit gap distances identified between frames 3 and 4, 4 and 5, 5 and 6, etc. in FIG. 2. The EDI 120 can be programmed to look at the gap distances between each of the frames that are shown in FIG. 2 for example. The frames in FIG. 2 are representative of normal station activity from any of the stations A through N that are connected to the CMSA/CD bus shown in FIG. 1 of the bus 130. In FIG. 3 we see five counters that are shown as 170, in FIG. 1. Counter 1 keeps track of the number of times two frames are separated by bit gap distance of less than 96 bits. Counter 2 keeps track of the number of times two frames are separated by bit gap distances greater than or equal to 96 bits but less than or equal to a value X. Counter 3 shows the number of times frames are separated by bit gap distances greater than value X but less than or equal to value Y. Counter 4 shows the number of times frames are separated by bit gap distances greater than value Y but less than or equal to 3,668,992. Counter 5 shows the number of times frames are separated by bit gap distances greater than value 3,668,992. With this information we can now begin to monitor, analyze and control the media configuration, the media performance and the transmission characteristics of the devices on the network 130.

Figure 4:
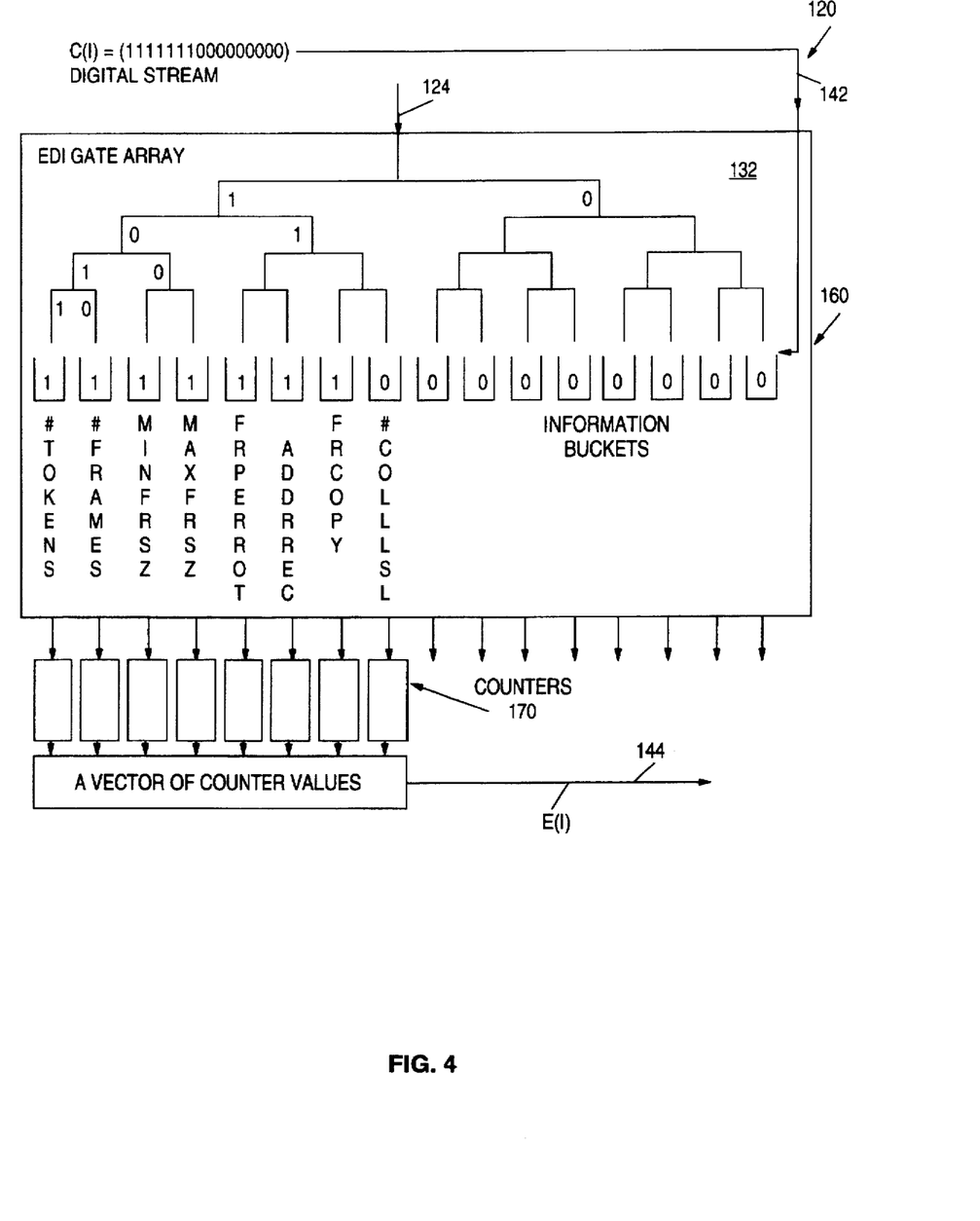
FIG. 4 is an illustration of an event driven interface (EDI) as is described in further detail in U.S. Pat. No. 5,365,514.

Looking at FIG. 3 we can see that counters 1 through 5 are defined to look for patterns. The pattern that we're looking for is a signature pattern for the ending of a particular frame and a signature pattern for the beginning of the next frame. This pattern can be loaded into the EDI 120 shown in FIG. 4. The EDI has a control signal coming down on 142 that loads the gate array with the appropriate pattern information that allows us to count the number of bits and the gaps between the frames and to associate those bits with the appropriate counter, in our example counters 1 through 5. A more detailed explanation of the event driven interface (EDI) 120 can be found in U.S. Pat. No. 5,365,514 assigned to the IBM Corporation and incorporated herein by reference.

Figure 5A:
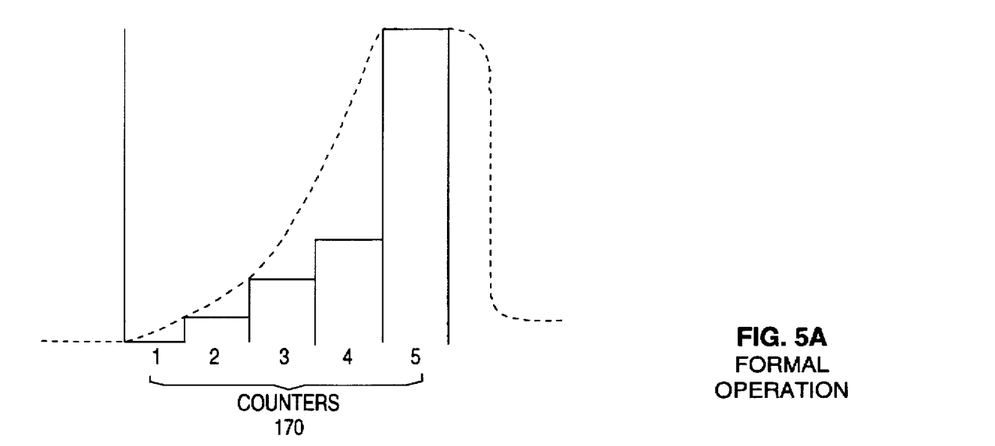
FIGS. 5A, 5B and 5C are illustrations of histograms which are derived from the counts accumulated in the counters of an event driven interface as is shown in FIGS. 3 and 4.
Figure 5B:
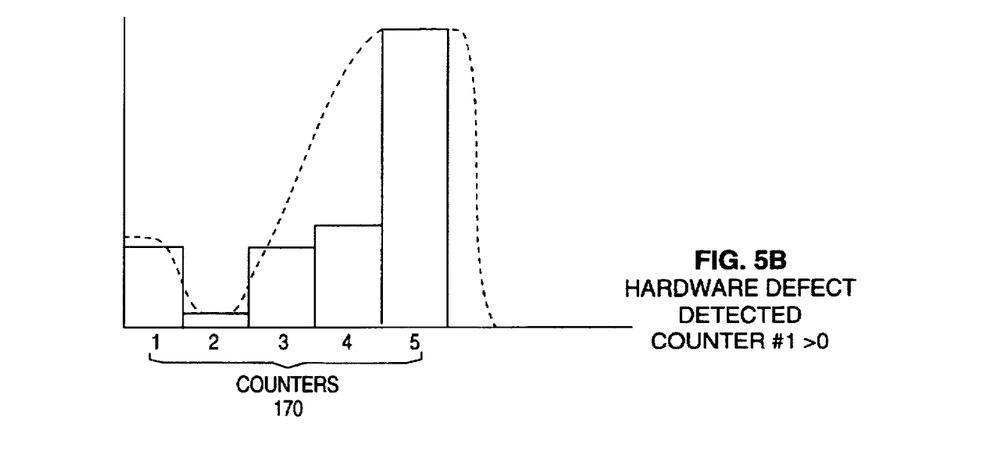
Figure 5C:
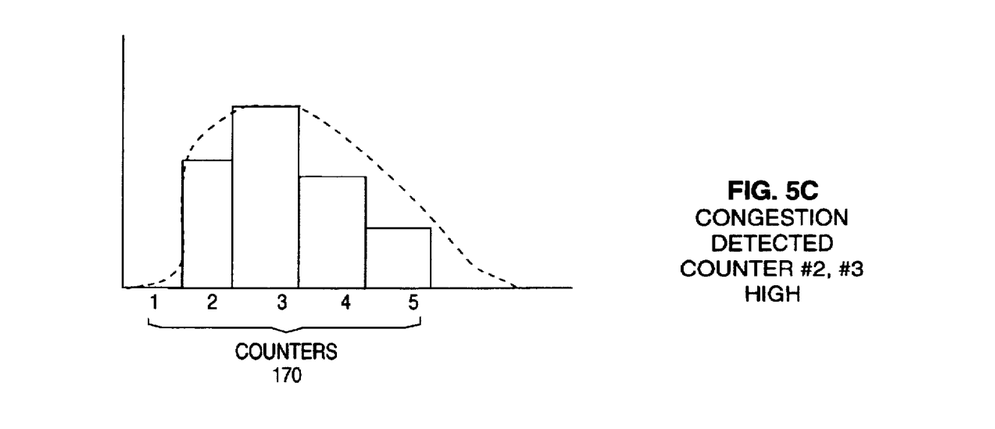
Figure 7:
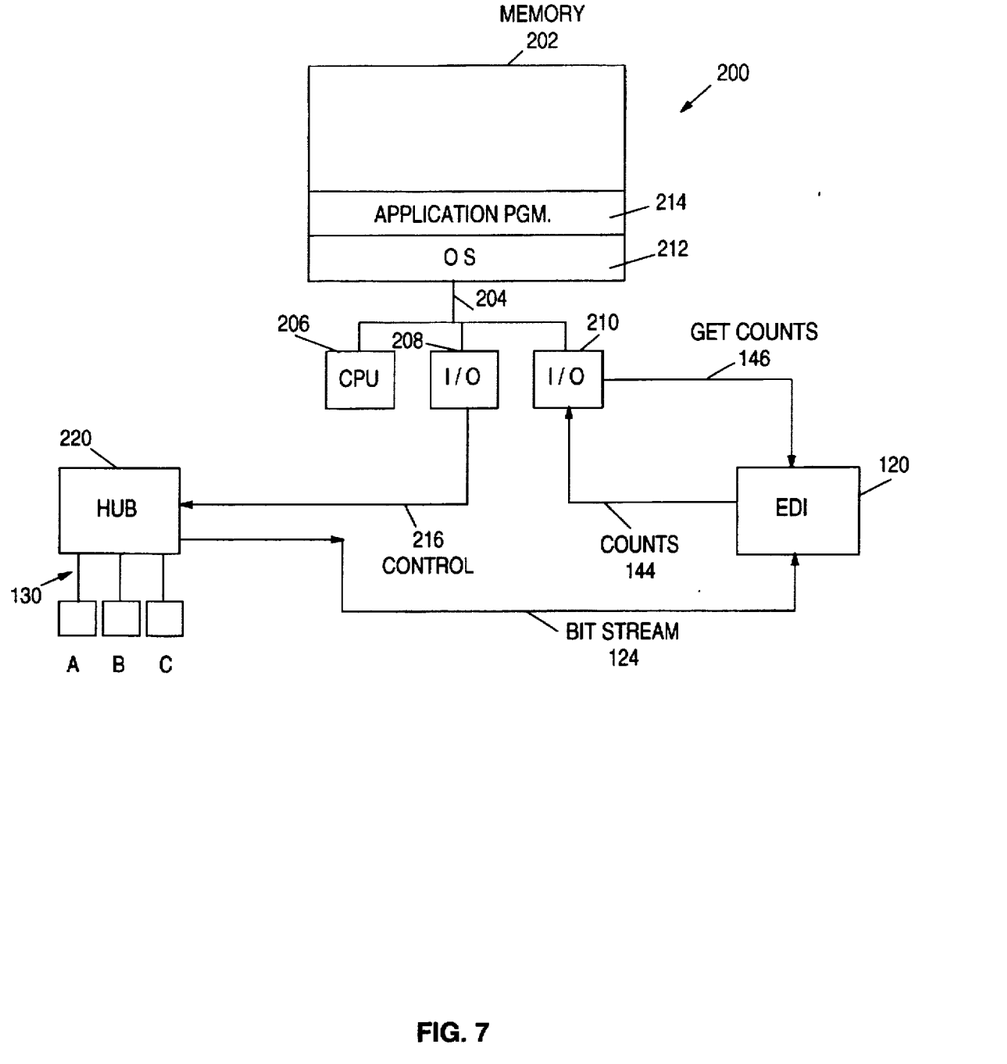
FIG. 7 is a functional block diagram of a monitor and control network, in accordance with the invention, which monitors the traffic and efficiently forms Ethernet segments from all the stations that are attached to the hub.

At an interval of time that can be set by an application program given as 214 in FIG. 7, the application program can interrupt over 146 the EDI 120 shown again in FIG. 7 to provide the values that are found in counters 1 through 5 for some period of time. The time period can be defined by the application program. The application program can get the information for the counters as often as he likes or can allow a significant amount of time to expire between his sampling of the counter values. Some potential counter values are shown in FIG. 5A. FIG. 5A shows an example of a distribution of counter values; where there is no value in counter 1, counter 1 has a value of 0, counter 2 has a smaller value, counter 3 has slightly larger values, counter 4 has a large value but counter 5 has the largest value. This is representative of the normal operation of an Ethernet LAN where a vast majority of the frames have significant interframe gaps between them, in other words large gaps of bits. What this means is this particular LAN is in normal operation, it's not experiencing any congestion and very little if any retransmission activity. FIG. 5B shows a similar histogram as shown in FIG. 5A except that counter 1 has a non-zero value. The non-zero value in counter 1 indicates a defective hardware component exists on the LAN because gap values have been detected that are less than 96 bits which is not allowed by the Ethernet implementation. FIG. 5C shows the difference between 5C and 5A in that counter 2, counter 3, counter 4 and counter 5 are shown nearly reversed, in other words the gap distribution is much different than what we see in FIG. 5A. In this particular example, counter 2 has significantly high value, counter 3 has a very high value and counters 4 and 5 values are less. What we see here is congestion being detected on Ethernet LAN because counters 1, 2, 3 and 4 all indicate activity within the ranges of which retransmission can take place. As a matter of fact counter 2 could be an indication of significant retransmission activity due to the fact that it is very close to the 96 bit threshold value. FIG. 5C indicates that congestion is occurring and represents a shift in the histogram from FIG. 5A because counters 2 and 3 are much higher values than what we see in counters 4 and 5. This indicates that traffic has become very bursty, retransmissions are occurring and traffic load is very heavy as opposed to FIG. 5A where very little retransmissions are occurring, very little bursting and traffic flow is more evenly spaced out.

Figure 6:
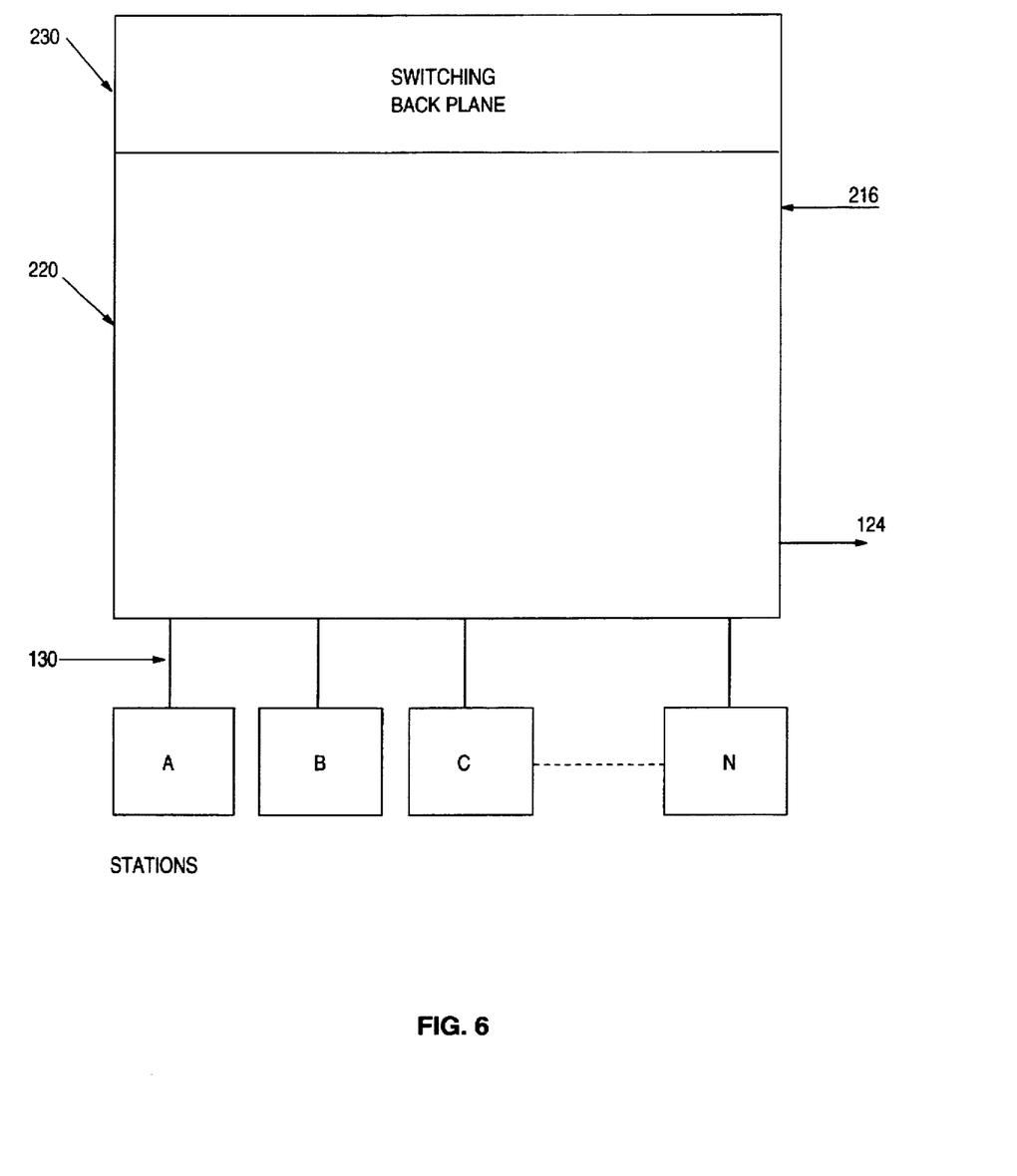
FIG. 6 is a functional block diagram of a switching hub which interconnects communicating nodes in an Ethernet network.

The information from the counters 170 is given as line 144 out of the EDI 120 in FIG. 7. This information is available to the application program 214 that is running on top of the operating system 212 in memory 202. This application program has algorithms and heuristics that are able to decide if the individual histograms are sitting in a state that looks like the state shown in FIG. 5A as opposed to the state shown in FIG. 5C. In one case (FIG. 5A) a normal running LAN is detected, in another case (FIG. 5C) congestion is detected. This information can be analyzed by the application program 214 and control signals 216 can be sent to an intelligent switching hub 220 in FIG. 7. Hub 220 has the ability to take the Ethernet segments that stations A, B, C, etc. through N that are on Ethernet segment 130 shown in FIG. 6 and partition the Ethernet segment into one or more independent segments with one or more stations associated with that segment. Instead of routing along a common bus we would use a switching back plane 230 which is shown in FIG. 6 of the intelligent hub 220 to allow communications between the partitioned segments. Since this invention is able to monitor the activity on a Ethernet LAN using, in this particular case, five counters, counter sizes could be very small in terms of 20 bits or less per counter. This gives us the ability of monitoring over an arbitrary large time frame with 200 bits the accumulated performance of an Ethernet segment and be able to provide a histogram of activity which allows us to judge the behavior and control the behavior of the segment based on the heuristics and algorithms that are embedded in the application program 214 in FIG. 7.

FIG. 7 shows a functional block diagram of the monitoring and control architecture, in accordance with the invention. The processor 200 includes memory 202, which is coupled by means of a bus 204 to the CPU 206, the first input/output (I/O) unit 208, a second I/O unit 210. The event driven interface (EDI) 120, is connected by means of line 144 and 146 to an input and output of the I/O unit 210. The counts accumulated from the counters 170 are provided to the I/O unit 210, for use by the application program 214. In accordance with the invention, the bitstream 124 from the local area network, Ethernet LAN 130, is supplied to the EDI 120 and results in the provision of the counts 144.

Further in accordance with the invention, the application program 214 analyzes the histogram such as the histograms in either 5A, 5B or 5C, and draws conclusions about the behavior of the Ethernet LAN 130. Those conclusions are represented by control signals which are output by the I/O unit 208 over line 216 to the switching hub 220. Switching hub 220 then is controlled to repartition the respective stations A, B, C, etc., so as to optimize traffic behavior in or remove a defective station from the local area network 130.

The processor system 200 of FIG. 7 and EDI 120 do not have to be external elements to the hub, they can in fact be internally integrated into the hub 220 of FIG. 6.

Examples of suitable switching hubs 220 can be found in the prior art.

The counter values that are returned which give information about the bit gap distances between frames can be accumulated over a period of time. These bit gap distance counters can be obtained from the EDI 120 on a periodic basis and the bit gap distance information in these counters can now be used to identify a trend. They can also identify potential errors on the local area network (media) 120 and can be part of a log that can be given to a local area network administrator, first to indicate that a redesign of the LAN 120 may be desired and to help him with understanding how to redesign the LAN. The counters or history of these counters can indicate patterns that reflect time of day activities and business cycle activities on the LAN.

Although a specific embodiment of the invention has been disclosed, it would be understood by those having skill in the art that changes can be made to that specific embodiment without departing from the spirit and scope of the invention.

What is claimed is:

1. A system for monitoring and controlling an Ethernet local area network, having a plurality of stations, comprising:

an event driven interface coupled to the local area network, for monitoring bit gap distances between characteristic bit patterns of adjacent frames communicated by said stations on the local area network, and outputting count values for selected bit gap distances;

analysis computer means coupled to an output of the event driven interface, for analyzing the count values and outputting control signals;

means for establishing a first selected bit gap distance as bit gaps of less than an interframe gap, corresponding to a hardware defect on said network;

means for establishing a second bit gap distance which is greater than a maximum retransmission delay, corresponding to there being no collisions on said network;

means for establishing a third bit gap distance value of X which is between the value of said interframe gap and the value of said maximum retransmission delay;

means for counting occurrences of bit gap distances between adjacent frames on the network for said first gap distance; said second bit gap distance and said third bit gap distance;

means for outputting said counts for analysis of the behavior of said network; and network switching means coupled to said means for outputting, and coupled to said plurality of stations on a local area network, for altering interconnection paths between the stations in response to the control signals.

2. The system of claim 1 which further comprises:

said selected bit gap distances including selected bit gap distance ranges.

3. A method for monitoring and controlling an Ethernet local area network, having a plurality of stations, comprising the steps of:

monitoring bit gap distances between characteristic bit patterns of adjacent frames communicated by said stations on the local area network and providing count values for selected bit gap distances;

analyzing count values and providing control signals;

establishing a first selected bit gap distance as bit gaps of less than an interframe gap, corresponding to a hardware defect on said network;

establishing a second bit gap distance which is greater than a maximum retransmission delay, corresponding to there being no collisions on said network;

establishing a third bit gap distance value of X which is between the value of said interframe gap and the value of said maximum retransmission delay;

counting occurrences of bit gap) distances between adjacent frames on the network for said first gap distance, said second bit gap distance and said third bit gap distance;

outputting said counts for analysis of the behavior of said network; and altering interconnection paths between the stations in the local area network in response to the control signals.

4. A method for monitoring and controlling an Ethernet local area network, having a plurality of stations, comprising the steps of:

monitoring bit gap distances between adjacent frames communicated by said stations on the local area network and providing count values for selected bit gap distances;

analyzing count values and providing control signals;

altering interconnection paths between the stations in the local area network in response to the control signals;

establishing a first selected bit gap distance as bit gaps of less than 96 bits, corresponding to a hardware defect on said local area network;

establishing a second bit gap distance which is greater than 3,668,992 bits, corresponding to there being no collisions on said local area network;

establishing a third bit gap distance value of X which is between the value of 96 and the value of 3,668,992;

counting occurrences of bit gap distances between adjacent frames on the local area network for said first bit gap distance, said second bit gap distance and said third bit gap distance;

outputting said counts for analysis of the behavior of said local area network.

5. A system for monitoring and controlling a CSMA/CD network, having a plurality of stations, comprising:

an event driven interface coupled to the network, for monitoring bit gap distances between characteristic bit patterns of adjacent frames communicated by stations on the network, and outputting count values for selected bit gap distances;

an analysis computer means coupled to an output of the event driven interface, for analyzing the count values and outputting control signals;

means for establishing a first selected bit gap distance as bit gaps of less than an interframe gap, corresponding to a hardware defect on said network;

means for establishing a second bit gap distance which is greater than a maximum retransmission delay, corresponding to there being no collisions on said network;

means for establishing a third bit gap distance value of X which is between the value of said interframe gap and the value of said maximum retransmission delay;

means for counting occurrences of bit gap distances between adjacent frames on the network for said first gap distance, said second bit gap distance and said third bit gap distance;

means for outputting said counts for analysis of the behavior of said network; and     a network switch coupled to said means for outputting and coupled to said stations on the network, for altering interconnection paths between the stations in response to the control signals.

6. The system of claim 5 which further comprises:

said selected bit gap distances including selected bit gap distance ranges.

7. A method for monitoring and controlling an Ethernet local area network, having a plurality of stations, comprising the steps of:

monitoring bit gap distances between characteristic bit patterns of adjacent frames communicated by said stations on the local area network and providing count values for selected bit gap distances;

analyzing count values and providing control signals;

altering interconnection paths between the stations in the local area network in response to the control signals;

establishing a first selected bit gap distance as bit gaps of less than an interframe gap, corresponding to a hardware defect on said local area network;

establishing a second bit gap distance which is greater than a maximum retransmission delay, corresponding to there being no collisions on said local area network;

establishing a third bit gap distance value of X which is between the value of said interframe gap and the value of said maximum retransmission delay;

counting occurrences of bit gap distances between adjacent frames on the local area network for said first bit gap distance, said second bit gap distance and said third bit gap distance;

outputting said counts for analysis of the behavior of said local area network.

* * * * *